United States Patent [19]

Chalin

[11] 3,868,469
[45] Feb. 25, 1975

[54] METHOD OF DUTCHING COCOA

[76] Inventor: Manuel L. Chalin, 68 Kingsley Rd., Kendall Park, N.J. 08824

[22] Filed: Feb. 19, 1974

[21] Appl. No.: 443,517

Related U.S. Application Data

[63] Continuation-in-part of Ser. No. 253,839, May 16, 1972, abandoned.

[52] U.S. Cl.............. 426/262, 426/454, 426/459, 426/464, 426/465, 426/373, 426/516
[51] Int. Cl........................................ A23g 1/100
[58] Field of Search .......... 426/147, 171, 352, 373, 426/377, 459, 464, 473, 454, 465, 372, 262, 516

[56] References Cited
UNITED STATES PATENTS

| 3,056,677 | 10/1962 | Colten | 426/377 X |
| 3,544,328 | 12/1970 | Dunning et al. | 426/372 |
| 3,754,928 | 8/1973 | Haney | 426/373 |

Primary Examiner—S. Leon Bashore
Assistant Examiner—M. Steven Alvo
Attorney, Agent, or Firm—Lowe, King & Price

[57] ABSTRACT

The dutching of cocoa to obtain a rich color is accomplished in a continuous fashion by grinding the pressed cake made from cocoa beans, converting the ground mass into a coarse, free-flowing powder, mixing the powder with the appropriate amounts of aqueous alkaline solution and desired additive, feeding this mixture into a combined cooker and pressurized extruder and then pelletizing the cooked composition. The pellets are formed by extruding the mass through appropriate dies and breaking off the rods to form pellets by interaction with a stationary plate. The preferable temperature range of the combined cooking-pressurizing step is 150°–230° F. and the preferred pressures are progressive to between 500 and 1,300 pounds per square inch adjacent the extruding die. The pellets are dried in a continuous fashion by a plurality of gas jet streams that lift and tumble the pellets continuously passing underneath on a vibrating conveyor. The drying is carried out in an inert atmosphere over a preferable time period of 2.5 to 3 minutes at temperatures preferably ranging from 350°–450° F. The initial moisture content of 33% is reduced to approximately 4%. The occurrence of favorable parameters in addition to color, such as taste, pH factor, water absorption and viscosity, low microbial flora, identifies the end product of the process of this invention.

10 Claims, 4 Drawing Figures

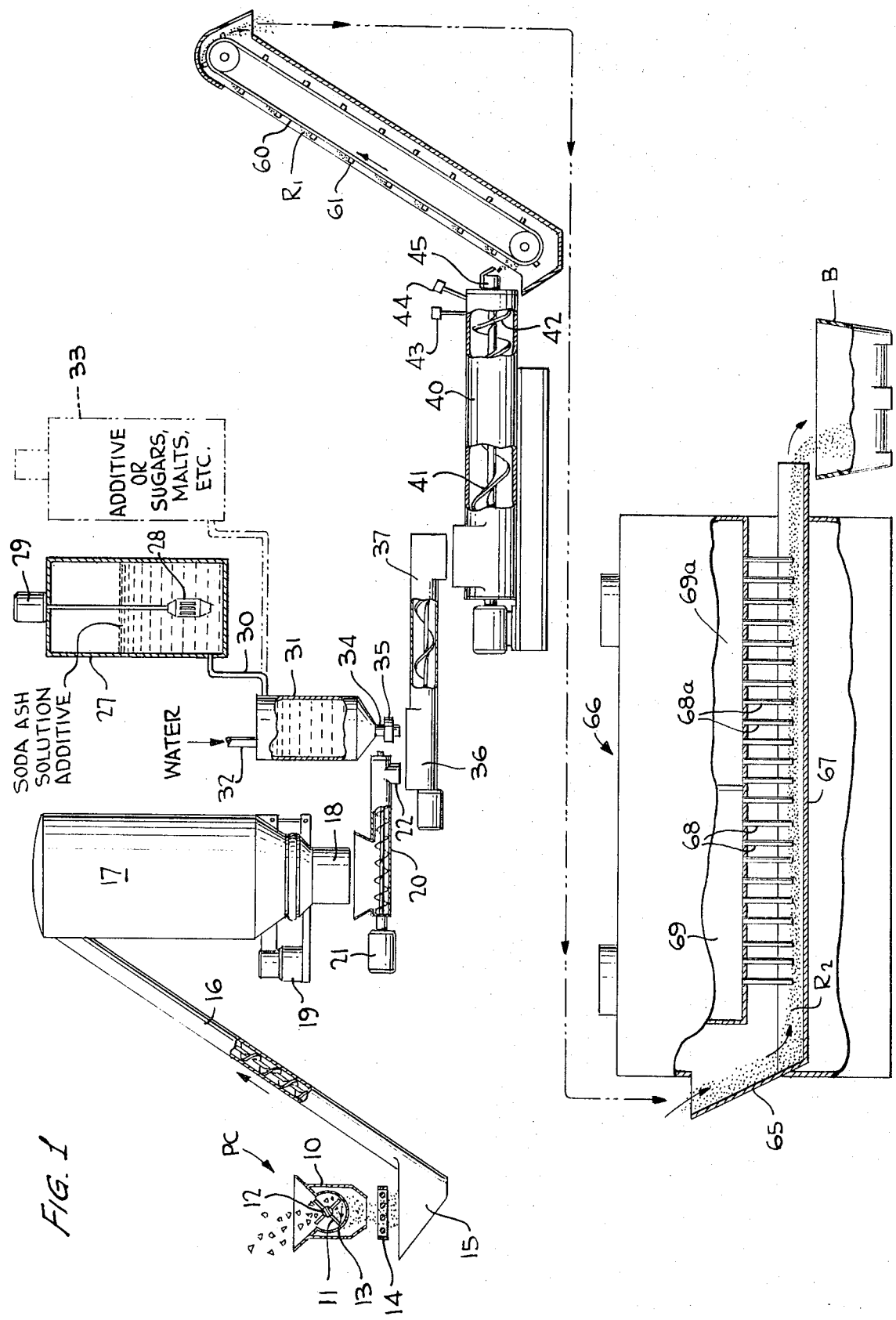

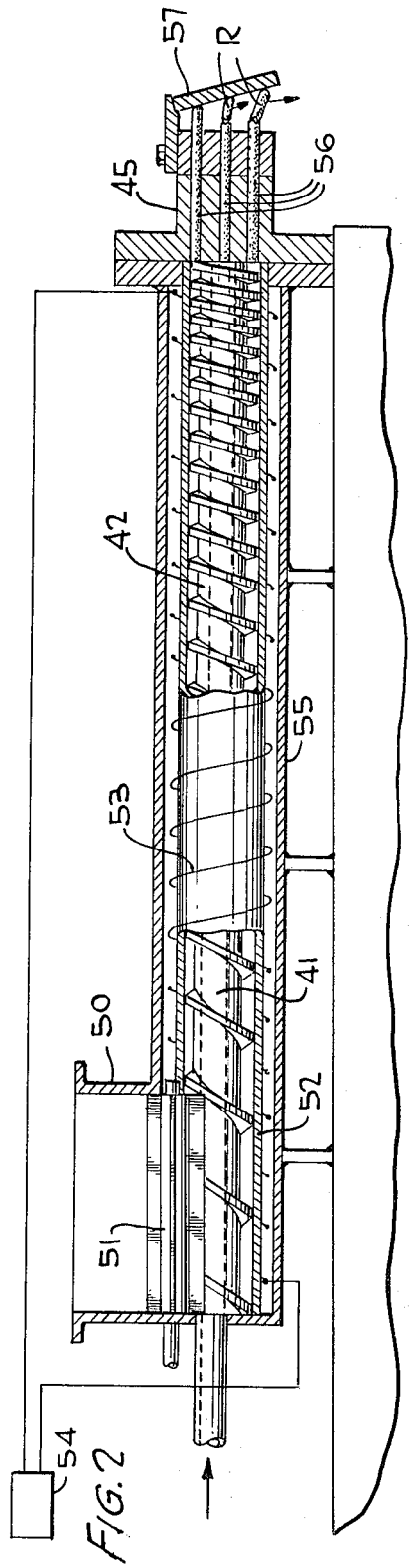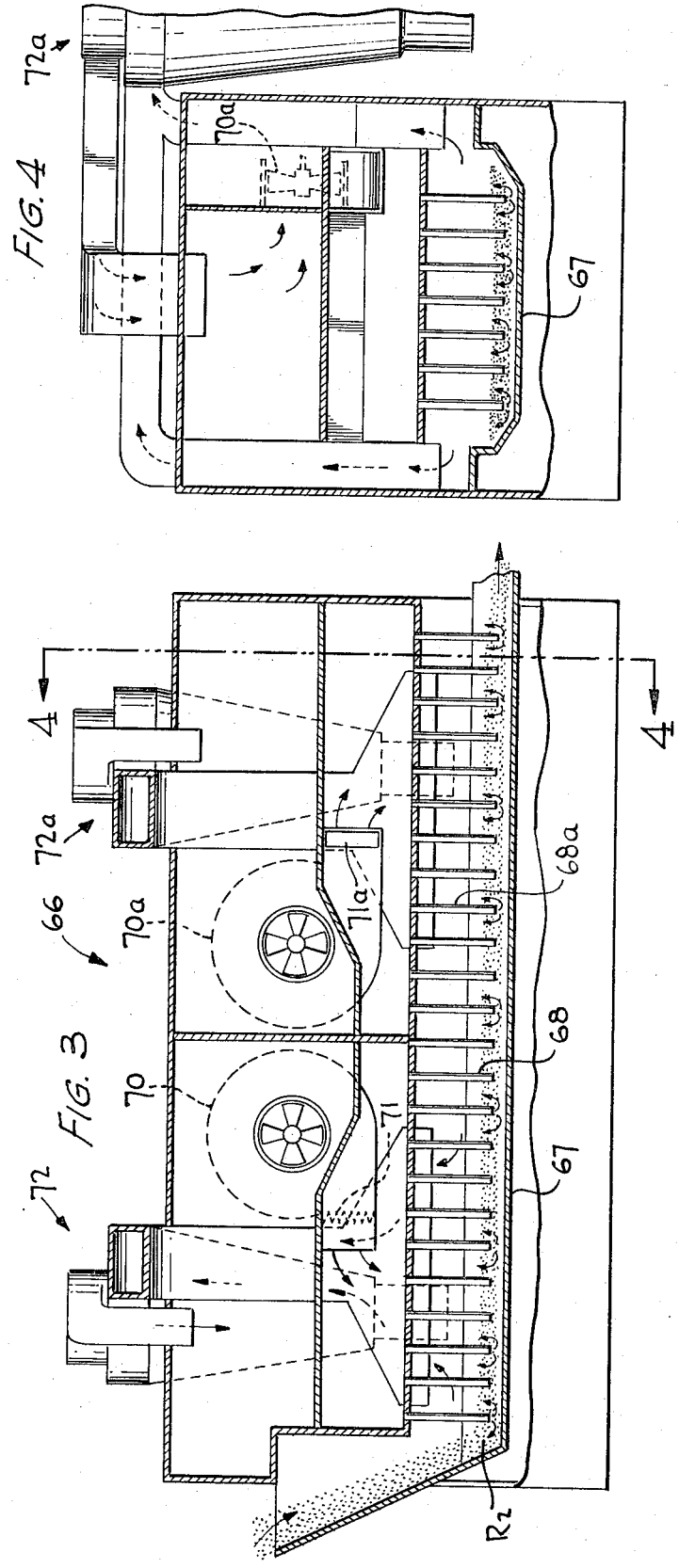

METHOD OF DUTCHING COCOA

REFERENCES TO RELATED APPLICATIONS

This application is a continuation in part of application Ser. No. 253,839, filed May 16, 1972 and now abandoned.

FIELD OF THE INVENTION

The present invention relates to the treatment of cocoa, and more particularly, to an improved method and system for dutching of cocoa for attaining a rich color, improved flavoring and other favorable parameters.

BACKGROUND OF THE INVENTION

Heretofore, the process of dutching of cocoa has been a relatively long and expensive proposition. Basically, the same batch process wherein the cocoa is treated in large cooking vats has been used for at least 100 years without significant improvement. In most prior art processes, after roasting the beans and removing the husk or shell, the broken pieces of the beans, commonly referred to as the nibs, are crushed or ground to break the cells and form a smooth, creamy paste, known as chocolate liquor. Next the liquor is fed to a hydraulic press whereby with the proper timing, temperature and moisture control and removal of a portion of the fat or cocoa butter, a press cake is formed. Typically, the press cake is next broken up and mixed with an alkalizing solution in the batch pressure cooker. The cooker then converts to a vacuum dryer to reduce the moisture content in the batch. The contents of the vat are then deposited in drums or other suitable containers for several days and allowed to cool. The cooled mass is then ground to a fine powder that can be used in devil's food cake, chocolate drinks, chocolate ice cream and chocolate cookies.

The standard batch process of the prior art suffers from several shortcomings. First, the conditions of treatment from batch to batch must be rigidly maintained in order to obtain proper moisture, pH, and low microbial flora content and uniformity of flavor and color. By the very nature of the non-continuous process, this has been found to be extermely difficult to do and requires the constant monitoring of people and machines. Secondly, the vat cooking and drying of the batch and the absence of significant mechanical working result in nonuniformity of heating of the cocoa so that parts are scorched and other parts are undercooked, giving a nonuniform product in terms of color and taste. The color obtaianed in the batch process is not as dark and rich in color with the same amount of alkali that is desired in many commercial products. In addition to requiring additional equipment and people to maintain the proper conditions, the large vats further financially burden the processor since the space required to house the equipment is substantial.

Problems of the prior art batch drying processes have resulted when previous attempts to depart from the above procedure have been made. First the danger of charring has arisen when the drying process has been attempted to be accelerated by employing a higher temperature. The prior processes have not included a necessary volume of working gas to distribute the heat to the end product efficiently and uniformly. The problem of case hardening of the individual cocoa solids is also a nemesis in the prior processes. This arises when the temperature of the product solid rises too rapidly thereby hardening the outer surface of the product. It is caused, in part at least, by not providing suitably small sized product solids, controlled heat, and large volume gas flow. Grinding and regrinding of the hardened solids thus becomes a trying necessity in an attempt to gain a satisfactory product.

In the past, the above overall "batch method" has been attempted to be replaced by a continuous method. Such attempts have, however, been unsuccessful and exemplary of those known in this art is shown by the U.S. Pat. No. 1,167,959 to Walker. The failure of the continuous processes has keyed on the inability to find a way to successfully form the mixture of cocoa material and alkaline solution and cook the same and the failure to devise a method for efficiently drying and cooling the cocoa end product in a continuous manner.

A more recent process for preparing dutched cocoa may be found in U.S. Pat. No. 3,754,928, a patent issued on Aug. 28, 1973, or subsequent to the filing of applicant's parent application. This patent discloses a method for dutching cocoa by subjecting an aqueous alkaline solution of cocoa to frictional and compressive forces to rapidly raise its tempeature to 200°–300° F. within about 10 seconds and maintaining this temperature for about 45 to 75 seconds prior to cooling. The patent discloses that the frictional and compressive forces may be applied by extrusion of the mixture through a die. The mixture initially contains about 4 to 6 parts by weight of water and after drying contains about 4 parts by weight of water. However, this process requires high temperatures and careful control of temperatures and residence times in passing the mixture through the die as well as intense initial pressurization. Moreover, the low initial moisture content is detrimental to good working of the mixture because 4 to 6 parts of water saturated with alkali is an insufficient amount of liquid to wet out all particles of cocoa subject to frictional and compressive forces. The consequences of incomplete wetting is incomplete chemical reaction and unequal distribution of the alkali used. Therefore, because of this, poor control of production of varieties and intensities of color in the cocoa as well as in the finished product in which the cocoa is the result.

A second recently issued patent, U.S. Pat. No. 3,778,519, teaches that in the impregnation of cocoa seeds with alkali or water and eventual sterilization, requires that the moisture content be kept as low as possible because of subsequent difficulties in drying. The present invention provides a procedure where outstanding results are obtained using high initial moisture contents. Accordingly, the method of the present invention represents improvements in the art of dutching cocoa.

OBJECTIVES OF THE INVENTION

Thus, it is one object of the present invention to provide an improved method of dutcing of cocoa that is continuous and results in improved color in an infinite variety of shades and tones and other favorable parameters of the end product.

It is another object of the present invention to gain maximum color using the legal amounts of alkali.

It is another object of the present invention to provide a process for dutching cocoa that is considerably faster, takes up less room in a plant for the processing equipment and is more economical to operate and properly control.

It is another object of the present invention to provide a continuous dutching process that gives uniform cooking of the cocoa without scorching or undercooking the product.

It is still another object of the present invention to provide a continuous dutching process wherein the product is under continuous mechanical working during premixing and cooking.

It is still another object of the present invention to provide a process for dutching cocoa wherein pellets of the finished product are dried and cooled by jet streams impinging on a moving bed to lift and tumble the pellets.

It is still another object of the present invention to produce a finished product that is virtually sterile.

It is still another object of the present invention to fully gelatinize the product so as to produce a better suspension of cocoa when used in cocoa drinks.

BRIEF DESCRIPTION OF THE INVENTION

According to the present invention, the cocoa material, such as a prepared press cake or nibs, is pulverized while at the same time an aqueous alkaline solution is being prepared in a separate tank. The powdered material and the solution are combined and subjected to vigorous mechanical working to form a homogeneous resultant product mixture. Immediately after this premixing step has been completed, the product mixture is placed in a combination cooker-extruder where it is continuously cooked under pressure and mechanically worked to further obtain uniformity of product. The cooker-extruder is preferably of an auger type wherein the pitch of the auger gradually decreases toward the discharge end to progressively subject the mixture to greater and greater pressure. This compression of the product mass permits efficient extruding through suitable die means positioned directly on the end discharge face of the cooker and to form a product rod that is readily divided into pellet size lengths. Drying of the pellets takes place in accordance with the invention on a fluidized bed by a plurality of jet streams that lift and tumble the pellets in an inert atmosphere.

The premixing of the ground press cake with the alkaline solution greatly enhances the interaction between the molecules within the product mixture to gain the desired color. This premixing also leads to a more homogeneous product mixture for reaction in the cooker-extruder to produce a more uniform color and taste. The mechanical working during the cooking step is also of great importance since the molecules of the mixture are constantly being stirred and mixed to prevent scorching and undercooking. Preferably, the cooking is performed in the range of approximately 150°–230° F. while the pressure maintained in the final stages of pressurization is between approximately 500–1,300 pounds per square inch.

The drying and cooling steps are of substantial importance since it is possible for the first time insofar as I am aware to rapidly dry cocoa product without the previous hazards, such as scorching and degrading the flavor or color, and then drastically cool the product. The 20–35 percent total moisture content of the material at the entrance to the premixer is reduced to approximately four percent at the end of the drying and cooling steps. The 20–35 percent moisture content has been found to provide an easily workable mixture and one conducible to forming a homogeneous mass and to be particularly suited to causing the rod to be easily broken by acting against a stationary plate as it leaves the die means of the extruder. In some cases, notably with the fat content in the range of 10 to 12 percent, the moisture may be reduced to the neighborhood of 27 percent and no plate is needed to effect breaking off to form the pellets. The pellets being in lengths of approximately one-quarter to one inch long and the rod being approximately one-eighth inch in diameter gives excellent drying action. The drying is carried out in an inert atmosphere in the temperature range of 350°–450° F. for approximately 2.5 to 3 minutes. The inert atmosphere may be any of the well known inert gases, e.g. nitrogen, argon, etc. as well as any gas which would not react with or affect the product. In the continuous procedure, air which has been burned to consume all the oxygen compounds and thus consists primarily of nitrogen, is suitable. The drastic cooling step lowers the temperature to approximately the ambient temperature in the same length of time.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

BRIEF DESCRIPTION OF THE DRAWINGS

FIG. 1 is a schematic showing of the entire method of continuous dutching of cocoa of the present invention from the initial stage of grinding the press cake to the depositing of the dried and cooled end product into a transport container;

FIG. 2 is a detailed cross-sectional view of the combined cooker and pressurized extruder utilized in the method of the present invention;

FIG. 3 is a cross-sectional view through the fluidized bed dryer and cooling equipment; and FIG. 4 is a cross-sectional view taken along line 4—4 of FIG. 3 showing the fluidized bed at right angles to the showing of FIG. 3.

DETAILED DESCRIPTION OF THE PREFERRED EMBODIMENT

With references now to FIG. 1 of the drawings, a complete schematic showing of the process steps for improved dutching of cocoa may be seen. The particular mechanical equipment shown to perform the various operations is considered to be the preferred equipment to carry out the steps of the invention; however, in accordance with the broad aspects of the invention, it is to be understood that other and equivalent equipment could be employed. The steps of the process begin with the illustration in the upper left hand corner of FIG. 1 of the grinding of press cake PC that has been formed in a press from the roasted cocoa beans. While use of a press cake of cocoa is preferred as the starting material, it is obvious that other cocoa forms such as nibs may also be used. However, regardless of the physical form at this stage it is subsequently pulverized and formed into a homogeneous mass.

Thus, the press cake PC enters the feed hopper of a grinder 10. The grinder may be of any conventional construction and may include a plurality of rotating blades 11 supported on a shaft 12. The cakes are ground or pulverized into a coarse, free-flowing powder that passes through a screen 13. It is necessary here that sufficient size reduction be attained that the resultant particles will be easily workable and will pass through the die. A preferred particle size is one in which the particles have a diameter of about one-eighth inch or less. Thus, it should be understood that the particles need only be ground so that they will subsequently pass through the die without plugging the opening. As to the screen through which the particles are passed, it is preferably of such size to provide particles having a size of about 50 to 150 mesh. From here the powder drops through a magnet grate 14 to remove any small metal particles that may have escaped previous cleaning steps. Immediately below the grate 14 is a hopper 15 that feeds a screw elevator 16.

The cocoa material is lifted by the elevator 16 and stored in a large bin 17 that is capable of feeding controlled quantities from the output nozzle 18. The storage bin may be of the type employing a vibrating mechanism 19 to feed the material from the storage bin 17. For more accurate control of the quantity of material being fed, a regulatory feeder 20 is provided that employs a rotating screw which is capable of accurate volumetric or gravimetric feeding, as is well known in the art. During operation, motor 21 of the feeder 20 is operated continuously at a selected speed so that a continuous flow of material is fed from output 22 in the form of powdered cocoa.

An aqueous alkaline solution is prepared in a suitable tank 27 in accordance with accepted practice using compounds of alkali and alkaline earth metals. A suitable alkali compound, such as sodium hydroxide, sodium carbonate (soda ash), sodium bicarbonate ($NaHCO_3$), potassium carbonate, potassium hydroxide, potassium bicarbonate, ammonium carbonate, ammonium bicarbonate, ammonium hydroxide, ammonia gas, magnesium carbonate, magnesium oxide, and mixtures thereof may be used. The alkaline solution should have a concentration of about 3 to 12 weight percent, and preferably about 5 to 12 weight percent. The solution is stirred, preferably by a centrifugal mixing head 28 that is rotated by a motor 29. The particular alkaline solution that is to be used as an additive to the powdered cocoa is then transferred through a suitable pipe 30 to a metering and storage tank 31. A water line 32 may be provided into the tank 31 in order to dilute the additive received from the tank 27 to reach the proper concentration that is needed. The pipe 30 and the line 32 can of course be provided with suitable regulating valves (not shown) to perform the function of obtaining the proper concentration of the solution required in accordance with government regulations. Dilution should be sufficient to provide a maximum of 3% anhydrous $K_2CO_3$ or its alkaline equivalent in the final product. With low fat nibs, up to 6% alkali can be present. Additional tanks, such as tank 33, may also be provided to feed into the metering and storage tank 31 as desired by the operator to add supplemental color, or sugars, malts or the like; although it is to be understood that such additions form no part of the present invention and thus need not be detailed in this disclosure. The discharge nozzle 34 of the metering and storage tank 31 is provided with a suitable valve 35 that is operated in conjunction with the motor 21 in order to properly proportion the alkaline solution additive with the powdered cocoa material entering the feed hopper 36 immediately below. At this stage the mixture should have a moisture content of about 20–35 weight percent.

The hopper 36 is the initial poiont of the important premixing step of the process of the present invention. The hopper is a part of a mixer 37 that subjects the damp mass or product. mixture to continuous mechanical working. The mixer may include one or more rotating shafts with mullers, paddles and ribbons mounted on the shafts for thoroughly mixing the product mixture into a homogeneous state. This is particularly advantageous since upon next entering the cooking step, the cooking may thus be performed in a uniform manner without creating of hot spots or uncooked portions that might otherwise result due to a non-homogeneous mixture. A suitable piece of equipment to perform this step is a "Double Shaft Continuous Mixer" manufactured by Paul O. Abbe, Inc. of Little Falls, New Jersey. While this is the preferred manner of carrying out this step of the process it is to be understood that any type of mechanical working can be utilized, it being only necessary that the mixture be subjected to such thorough mixing that a homogeneous mass will be provided prior to the cooking step.

The product mixture is now ready to enter the next important step of the process of the present invention. This step continues the mechanical working of the product mixture and concurrently cooks the mixture under pressure that progressively increases. The preferred equipment used is the cooking extruder manufactured by The Bonnot Company of Kent, Ohio, although it is to be understood that equivalent equipment may be utilized in accordance with the broad aspects of the invention. In the preferred equipment shown, the increase in pressure is provided by a variable pitch screw with, for example, a first stage 41 and a second stage 42 being shown in FIG. 1. A more detailed review of the preferred cooking extruder will be set forth in conjunction with FIG. 2 of the drawings. It should be understood that other types of mechanical working may be used within the extruder. Suffice it to say that the product mixture is continuously worked by the screw and is progressively pressurized while at the same time being heated to cook the product. A suitable pressure transducer 43 and temperature transducer 44 are provided adjacent the exit end of the equipment in order to gauge these critical processing parameters during the operation. The exit end of the extruder 40 is provided with an extruding die head 45 out of which the compressed product mass is extruded and provided ready for drying. The extruding step forms product rod that is divided into relatively short lengths to form product pellets. This action along with the additional details of the equipment can be seen in FIG. 2, now to be discussed.

In the cooker-extruder, the temperature is maintained at about 150° to 230° F., preferably about 180° to 212° F., while progressively increasing the pressure to a final stage of pressurization of about 500 to 1,300 pounds per square inch, preferably about 700 to 1,100 psig. In general, the homogeneous mixture is heated substantially by the frictional forces or mechanical working taking place within the extruder which can operate adiabatically but additional heating means is provided if it is necessary to maintain the indicated temperature range. Temperatures above those indicated may result in charring of the product.

The residence or cooking time within the cooker-extruder will vary over a limiated range with limitations being placed thereon by the size of the die opening and the speed of the screw. Suitable die openings range from approximately 0.100 inch to about 0.150 inch. Larger openings may be used but the product quality and economies of operations may be adversely affected. Much larger openings would also be unsuitable because the required pressures could not be produced. In general, it may be stated that in operation of a continuous process with continuous introduction of cocoa material, for a die having a diameter ranging from about 0.100 inch to about 0.150 inch, the cooking or residence time can range from about 2½ minutes to about 5 minutes. A preferred residence or cooking time within the cooker-extruder is about 4 to 5 minutes. The time within the cooker is important, the time within the die being only about 1 second or less.

At the entrance end of the cooking extruder 40 the mass from the mixer 37 is received in a suitable process hopper 50. A suitable beater 51 feeds the mass in a controlled fashion into working barrel 52 defining an elongated cylindrical chamber. A steam heating element 53 receiving power from a source 54 is wrapped around the barrel 52 and a jacket 55 confines the energy of the heating element. The variable pitch screw sections of the stages 41, 42 can be more clearly seen in this figure, and the progressive nature of the pitch of the screw can be seen in detail. The volume within one turn of the screw in the stage 41 can be seen to be reduced by several times toward the exit end in stage 42 of the equipment so that the mass has been pressurized by substantially the same factor. The extruding head 45 includes any number of suitable extruding dies or passageway means 56 and out of which come the lengths of product rod R. The composition of the product is gauged by moisture content of about 20–35 weight percent, preferably about 27–33 percent in order to facilitate breaking off of the rod cleanly as it leaves the extruder head 45. This breaking off process is facilitated by providing a stationary plate 57 across the path of the exiting rod R.

With reference now back to FIG. 1, the rod lengths or pellets R are fed to a continuous belt conveyor 60 having a plurality of transverse members 61 that form product carrying pockets or buckets to continuously lift the pellets in piles $R_1$ into a receiver for the next stage. At this point the pellets still contain about 85–97 percent of the initial water added to the press cake.

As the pellets exit the conveyor 60, they enter such a fill receiver 65 of a combined fluidized bed dryer and cooler unit 66. The bed of pellets is designated by reference indicia $R_2$ in FIG. 1 and is formed by the horizontal support 67 of the unit 66. A plurality of downwardly extending nozzles 68, 68a inject jet streams of heated gas down into the bed to lift and tumble the pellets. The jet streams of gas are provided from a heating plenum 69 and a cooling plenum 69a, respectively, above the corresponding nozzles 68, 68a. The support 67 for the bed $R_2$ of pellets may be oscillated or vibrated in order to effect feeding along in a continuous fashion. At the exit end of the unit 66, the dried and cooled pelletized end product is deposited in a suitable transport container 70 for further processing and forwarding to the converter or maker of the final cocoa product.

In order to fully understand the nature of the drying and cooling process, reference may be made to FIGS. 3 and 4 of the drawings. Here it can be seen that suitable fans 70, 70a are provided to feed the separate plenums 69, 69a, respectively. In conjunction with the fans 70, 70a there may of course be provided a suitable heating and cooling elements, 71, 71a respectively, to provide the necessary heat exchange to dry and cool the bed $R_2$ of the product. The cooling element 71a also includes a dehumidifier and filter means to clean and dry the gas before being introduced into the fluidized bed $R_2$. As clearly shown in FIGS. 3 and 4, the exit orifices of the nozzles 69 extend down into the bed $R_2$ so that the exiting gas impinges on the bottom support 67, is turned upward and thus serves to lift the pellets and thoroughly tumble the same to accomplish the desired drying and cooling functions. Vortex separators with suitable entry and return ducts, generally designated by the reference numerals 72, 72a, are used to continuously remove any fine particles that may be removed by the vigorous working of the pellets during these steps. The tumbling of the pellets as they are raised from the feeder support 67 performs these operations in a highly advantageous manner that has not heretofore been discovered. The unit 66 may be a specific fluidized bed machine known as the "Jetzone" manufactured by Wolverine Corporation, 30 Osgood Street, Methuen, Massachusetts, although other equivalent equipment may be used in accordance with the broad aspects of the invention.

Thus having described the equipment and the steps of the process, a more particular example of the process and the results can be set forth in the following Example. Particular attention should be directed in this Example to the operating conditions placed on the equipment that greatly enhances the efficiency and desired results of the process.

EXAMPLE

Cocoa material in the press cake form was obtained having preferably 10 to 16 percent fat. The press cake PC was comminuted through the pulverizer or grinder 10 so as to form the product into a coarse, free-flowing powder of sufficiently small size that it would not plug the one-eighth inch die opening. A particle size of about 60 mesh was suitable. The powder was transferred to the storage bin 17, fed through the nozzle 18 and into a metering feeder 20 and released from the nozzle 22 at a rate of approximately 972 grams per minute. A final diluted solution of 22.35 grams of anhydrous sodium ash ($Na_2CO_3$) in 390 grams of water was prepared in the metering and storage tank 31 and fed through the valve 35 on the nozzle 34 at a predetermined rate to give a 33 percent moisture basis. The mixer 37 was operated in a continuous fashion to completely combine and mix the soda ash solution with the powdered cocoa material, and the resultant homogeneous product mixture was then introduced into the cooking extruder 40 at a continuous rate. Temperatures within the extruder 40 were controlled in the range at 190° F. and the pressures are progressively increased and in the final stage were controlled to 900 pounds per square inch. The product was thus continuously mechanically worked by the auger as the cooking was carried out. Total time within the cooker-extruder was 4½ minutes. The compressed product mass was continuously fed from the extruding head 45 and formed into approximately one-eighth inch diameter rods as the mass was extruded through the one-eighth inch die holes. This rod contained approximately 29 percent moisture; a loss of 4 percent moisture occurring as the rod emerges from the extruder 40. This moisture content allowed the rod to be freely broken into the pellets R by the presence of the stationary plate 57.

The pellets formed were from one-quarter inch to 1 inch in length. Because of the control of the moisture content and the equipment used, there was no need to employ a cutter in order to cut the rod. These pellets were particularly suitable for drying and cooling because of the large surface area that is exposed to the gas of the fluidized bed unit 66.

The plenum 69 of the fluidized bed unit 66 was provided with a heated inert gas (nitrogen) that was injected by the nozzles 68 into the bed $R_2$ of pellets in the drying section to lift and tumble the pellets for approximately 2.5 to 3 minutes as the bed $R_2$ moved continuously along the support 67. The heating element 71 raised the temperature and maintained the same in the range of 350° to 450° F. Finally, the pellets were cooled to about ambient temperature under the nozzles 68a in about 2.5 to 3 minutes. The product had a rich dark color and a moisture content of about 4 weight percent.

In summary, dutching of cocoa is performed by grinding the pressed cake made from cocoa beans, converting to powder, mixing with alkaline solution, and cooking the product mixture under pressure and continuous mechanical working. The compressed product of critical moisture is passed through die means to form pellets by breaking into relatively short lengths. The drying and cooling of the pellets is performed in an efficient manner on a fluidized bed with the pellets being lifted and tumbled by downwardly directed jet streams of inert gas.

In the process of this application the initial moisture content, preliminary mixing to a homogeneous mass and residence time within the cooker-extruder are especially critical in order to provide a final cocoa product having a rich color and improved flavor. By use of the term "rich color" is meant a dark uniform color whether brown, red or black.

In this disclosure, there is shown and described only the preferred embodiment of the invention, but, as aforementioned, it is to be understood that the invention is capable of use in various other combinations and environment and is capable of changes or modifications within the scope of the invention concept as expressed herein.

What is claimed is:

1. The method of continuous dutching and drying of cocoa so as to attain a rich color and other favorable parameters in the end product, comprising the steps of:
    pulverizing a press cake or nibs of cocoa material into a free-flowing powder state;
    forming an aqueous alkaline solution having a concentration of about 3 to 12 weight percent wherein the alkaline solution is formed from ammonia gas or a hydroxide, oxide, carbonate or bicarbonate of an alkali metal, ammonium or an alkaline earth metal or mixtures thereof;
    combining said aqueous alkaline solution with said pulverized material and additional water of dilution to form a product mixture in the form of a damp mass having an initial moisture content of about 20 to 35 percent and a maximum of up to about 6 weight percent alkaline equivalent to potassium carbonate and subjecting the resultant product mixture to thorough mixing to form a homogeneous product mixture;
    cooking the product mixture at a temperature of about 150°–230° F. for a residence period of about 2½ to 5 minutes while continuing mixing and while progressively increasing the pressure to a final stage of pressurization of about 500–1,300 pounds per square inch to form a heated and pressurized mass, wherein cooking is performed by feeding the product mixture into a chamber containing means to form the product mixture into a working mass corresponding to said chamber, providing progressively greater pressure on said working mass as the mixture moves from the entrance end of the chamber to the exit end, controlling the heating in said chamber to raise the temperature of the product mixture to cooking temperature;
    extruding the resultant heated and pressurized mass through die means to form a product rod, wherein the step of extruding the product mass is carried out at the exit end of the elongated chamber immediately after pressurized cooking of the product mixture by passing the product mass through an extruding die having at least one restricted opening to form the product rod;
    dividing the product rod into lengths to form product pellets, said pellets at this stage containing about 85–97 percent of the initial moisture content; and
    drying said product pellets on a fluidized bed as the pellets continuously move along said bed by contact with a heated inert gas at a temperature of about 350°–450° F. for 2.5 to 3 minutes and then rapidly cooling the pellets with filtered air to approximately ambient temperature, wherein said pellets have a moisture content of about 4 percent; whereby dutching is carried out in a controlled fashion with interruption.

2. The method according to claim 1 wherein the extruding die has an opening ranging from a diameter of about 0.100 to about 0.150 inch.

3. The method of continuous dutching of cocoa of claim 2 wherein the temperature during the cooking step is maintained in the range of approximately 180° to 212° F. and the pressure is maintained in the final steps of pressurization in the range between about 700 to 1,100 pounds per square inch.

4. The method of continuous dutching of cocoa of claim 3 wherein the combining step of the aqueous alkaline solution with the pulverized material is carried out to give a product mixture of about 27–33 percent total moisture content.

5. The method of continuous dutching of cocoa as defined in claim 4 wherein the fat content of the cocoa material is between 10% and 16%.

6. The method according to claim 5 wherein the pellets are cooled to approximately ambient temperature within a period of about 2.5 to 3 minutes by contacting with filtered air.

7. The method of continuous dutching of cocoa as required in claim 6 wherein the step of dividing the product rod is performed by moving the product rod from the die means directly into the path of a stationary plate that bends the rod and causes breaking into lengths of approximately one-quarter to 1 inch.

8. The method of continuous dutching of cocoa as defined in claim 7 wherein the drying step is performed by injecting a plurality of fluid jet streams downwardly onto a continuously moving bed of product pellets, whereby the pellets are lifted and tumbled by the jet streams impinging against the support for the bed of pellets and turning upward.

9. The method of continuous dutching of cocoa defined in claim 8 wherein the jet streams and the surrounding space where the pellets are dried is an inert gas.

10. The method of continuous dutching of cocoa as defined in claim 9 wherein the alkaline solution contains sodium carbonate as the alkali, the initial moisture content is about 33%, the temperature within the cooker-extruder is about 190° F., the final pressure is about 900 psig., the residence time within the cooker-extruder is about 4½ minutes and the diameter of the die opening is about one-eighth inch.

* * * * *